April 28, 1931. G. H. J. MAAS 1,802,436
RAILWAY AND TRAMWAY SYSTEM
Filed Oct. 24, 1929
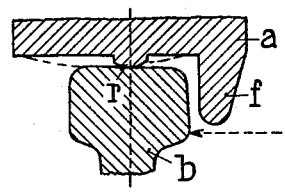
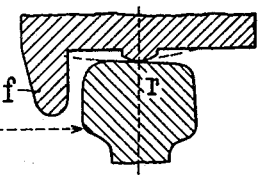
Fig. 1.
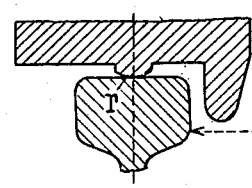
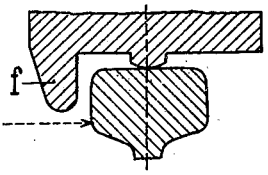
Fig. 2.
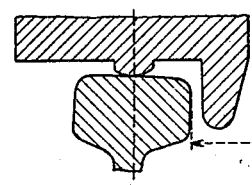
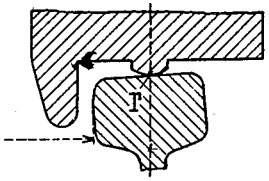
Fig. 3.
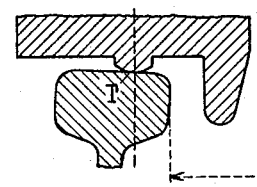
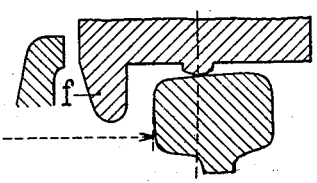
Fig. 4.
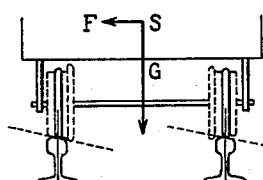
Fig. 6.
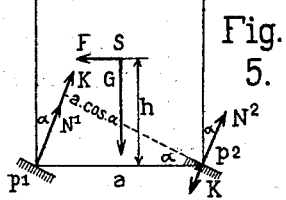
Fig. 5.
Fig. 7.
INVENTOR
Gottfried H. J. Maas
By B. Singer, Atty Patented Apr. 28, 1931

1,802,436

UNITED STATES PATENT OFFICE

GOTTFRIED H. J. MAAS, OF BERLIN-STEGLITZ, GERMANY

RAILWAY AND TRAMWAY SYSTEM

Application filed October 24, 1929, Serial No. 402,108, and in Germany November 2, 1928.

My invention relates to improvements in railway and tramway systems, and more particularly in the construction of the wheel rim and rail.

In the patent of the United States No. 1,561,557, granted to me November 17, 1925, I have described a railway and tramway system in which the centrifugal force of the vehicles running through curves in horizontal position shall be compensated by the form of the rails and the wheel rims. The object of the present invention is to improve the system of the said patent showing only a fundamental principle. The improved system will be able to be used in tracks constructed with Vignoles rails, the cars running with the normal velocity or with velocities which are larger or smaller than the normal. With this object in view my invention consists in constructing the tires with a circumferential rib projecting therefrom and providing the tread of the vessel, the said rib having a rounded surface, and the median planes of the ribs of the wheels having a distance equal to that of the tread circle planes of the wheels. Thereby the direction of the load of the wheels passes through the points in which the planes of the said circles intersect the inclined faces of the rails, and they act within a narrow strip of the rail. Further, the wheel tires thus constructed run on rails now in use just as safely as the ordinary wheel tires, and in curves having an increased gauge there is no larger eccentricity of the load on the rails than the eccentricity which is the normal and allowable in the ordinary wheel tires.

The projecting rounded ribs of the tires or the tires themselves are preferably made from a high grade material having a high resistance to wear, such for example as noble steel. In connection with the construction of the wheel tire I construct the rail at its inclined and plane top face with a longitudinal groove of gradually in cross direction increasing inclination, so that the reaction of the rail opposed to the centrifugal force varies.

For the purpose of explaining the invention several examples embodying the same have been shown in the accompanying drawings in which the same reference characters have been used in all the views to indicate corresponding parts. In said drawings, Fig. 1, is a sectional elevation showing the heads of two Vignoles rails and the adjacent portions of wheel ribs, the said rails forming a part of a curve and having their top faces inclined downwardly and towards the center of the curve, the dotted line signifying the Figure 3 of said patent.

Fig. 2, is a similar sectional elevation, the Vignoles rails forming a part of the straight track and being formed with a horizontal top face, Fig. 3, is a similar sectional elevation of Vignoles rails forming a part of a straight track, the top faces of the rails being symmetrically inclined relatively to each other, Fig. 4, is a similar sectional elevation showing Vignoles rails forming a part of a curved track of normal construction and having the greatest permissible widening of the gauge, Fig. 5, is a diagrammatical elevation showing a portion of a curved track having the Vignoles rails formed with parallel and inclined top faces, the said track having a normal gauge, the said figure showing in addition a diagram illustrating the forces acting on the rails, Fig. 6, is a diagrammatical view on an enlarged scale showing the position of the projecting tire rib relatively to wheel tires of different constructions, the said rib running on an inclined top face of a rail, and Fig. 7, is a diagrammatical elevation showing a modification of the construction of the head of a Vignoles rail formed with an inclined top face and a longitudinal cavity.

In the construction shown in Fig. 1 the wheel ribs *a* are formed at their middle with narrow projecting circumferential ribs *r* formed with strongly rounded outer faces, the said ribs running on rails *b*. *f* are the wheel flanges. In dotted lines I have signified the form of the tread of the tire such as is proposed in Figure 3 of my aforesaid Patent 1,561,557, the tire being there rounded along an uncertain and doubtful curve of very much larger radius than the ribs *r*. By providing the rounded rib *r* the load of the wheel always acts in the planes of the tread circles of the wheels, and when using the wheels in curves of tracks of ordinary construction having a widened gauge the eccentricity of the load does not exceed the permissible maximum. Thus normally the median lines of the rounded faces of the ribs coincide with the median lines of the rails.

In wheel tires of ordinary construction having plane treads the contact of the tires with the plane top faces of normal Vignoles rails is indefinite, particularly, because by wear of the wheel tires and rails the points of contact continuously change their positions. But the rounded rib running on the rail forms a narrow and elastically compressed surface which adapts itself also to rail faces of non-uniform wear. Therefore the tire can not wear so that the rounded portion of the rib is lost and transformed into a plane surface, because when running through right and left curves of different radii the point of contact of the rib and the rail is continuously changed. The transmission of the pressure by means of the rim is preferable also as compared to the rounding of the whole tread of the tire, because in case of small radii and strongly rounded ribs the transmission of the load to the rails is more definite. Figs. 2 to 4 show that when using the new wheel tires on tracks of normal construction the median planes of the ribs coincide with the tread circles of the wheels running on the rails, and that in curves having a widening of the gauge the eccentricity of the load does not exceed the permissible degree.

Fig. 5 shows the result of the new construction of the wheel tire in curves of the track in which the heads of the rails are formed with parallel top faces and the inner and outer rails are at the same level. In the diagram of forces shown in the said figure the normal reactions of the inclined faces have received the character $N^1$ and $N^2$, the said reactions resulting from the weight G of the vehicle plus or minus the component K resulting from the centrifugal force F. The said pressures depend on the inclination $\alpha$ of the top faces of the rails, which angle must be determined for each radius of the curve and for each normal velocity of the vehicle, and which angle practically is always so small that the stability of the rolling stock is not interfered with, the tangent of the said angle being smaller than 0.1 (tg. $\alpha < 0.1$).

For the purpose of correct compensation for each velocity special rails or pairs of rails must be provided. However, since this is not possible I provide the top faces of the rails with a cavity of the construction shown in Fig. 7, the form of the said cavity being adapted to the varying centrifugal force $$\frac{v^2}{gR}$$

by the varying inclination of the cavity relatively to the horizontal and forming therefore a parabola. In the point *m* the cavity has a small inclination, and the said inclination is large at *m'*.

I claim:

1. A railway or tramway system, comprising Vignoles rails having the top faces of their heads parallel to each other and inclined downwardly and towards the center of the curve, and wheels having ribs projecting from their circumferential faces and having rounded outer faces, the distance between the median planes of the said ribs being equal to the distance between the planes of the tread circles of the wheels.

2. A railway or tramway system, comprising rails having the top faces of their heads parallel to each other and inclined downwardly and towards the center of the curve, said rails being formed in their inclined top faces with cavities the inclination of which is a function of the centrifugal force $$\frac{v^2}{gR}$$

and therefore, a parabola and smaller in the lower portions and larger in the upper portions of said top face than the inclination corresponding to the median velocity of the vehicle, and wheels having ribs projecting from their circumferential faces and having rounded outer faces, the distance between the median planes of the said ribs being equal to the distance between the planes of the tread circles of the wheels.

In testimony whereof I hereunto affix my signature.

GOTTFRIED H. J. MAAS.